May 24, 1932. F. A. THAHELD 1,859,541
INTERNAL COMBUSTION ENGINE
Filed April 7, 1930 11 Sheets-Sheet 9
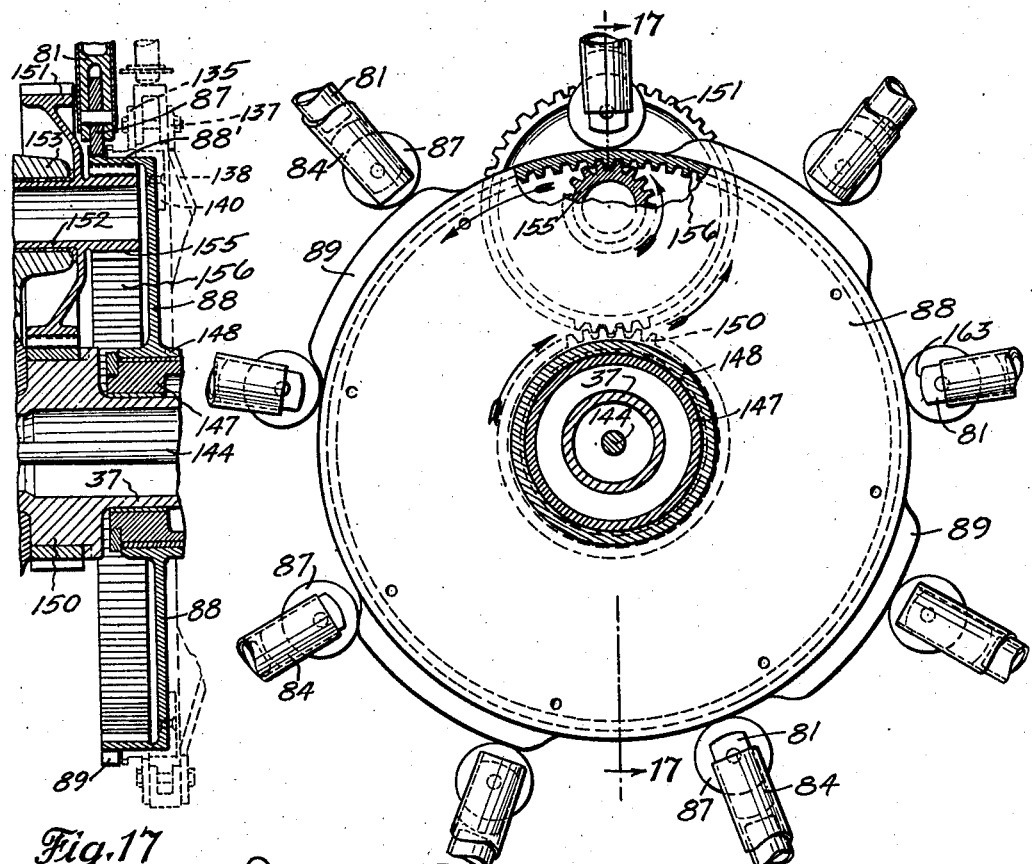
Fig.17
Fig.16
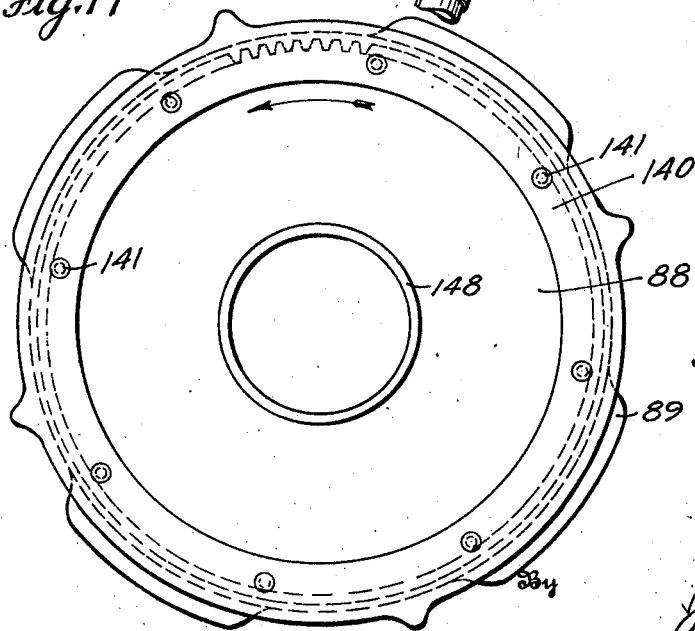
Fig.18
Inventor
Feri A. Thaheld
By Jack A. Schley
Attorney

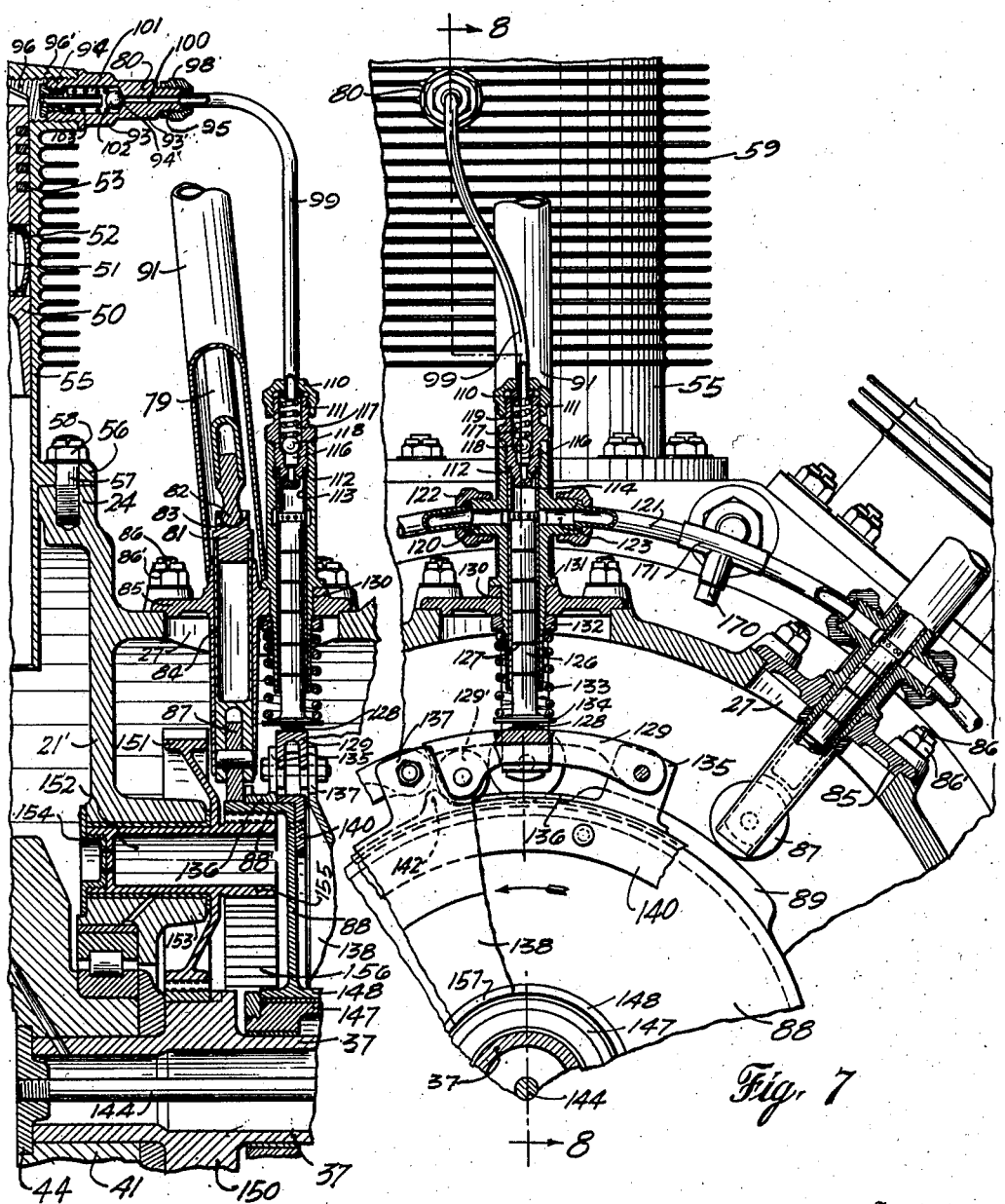

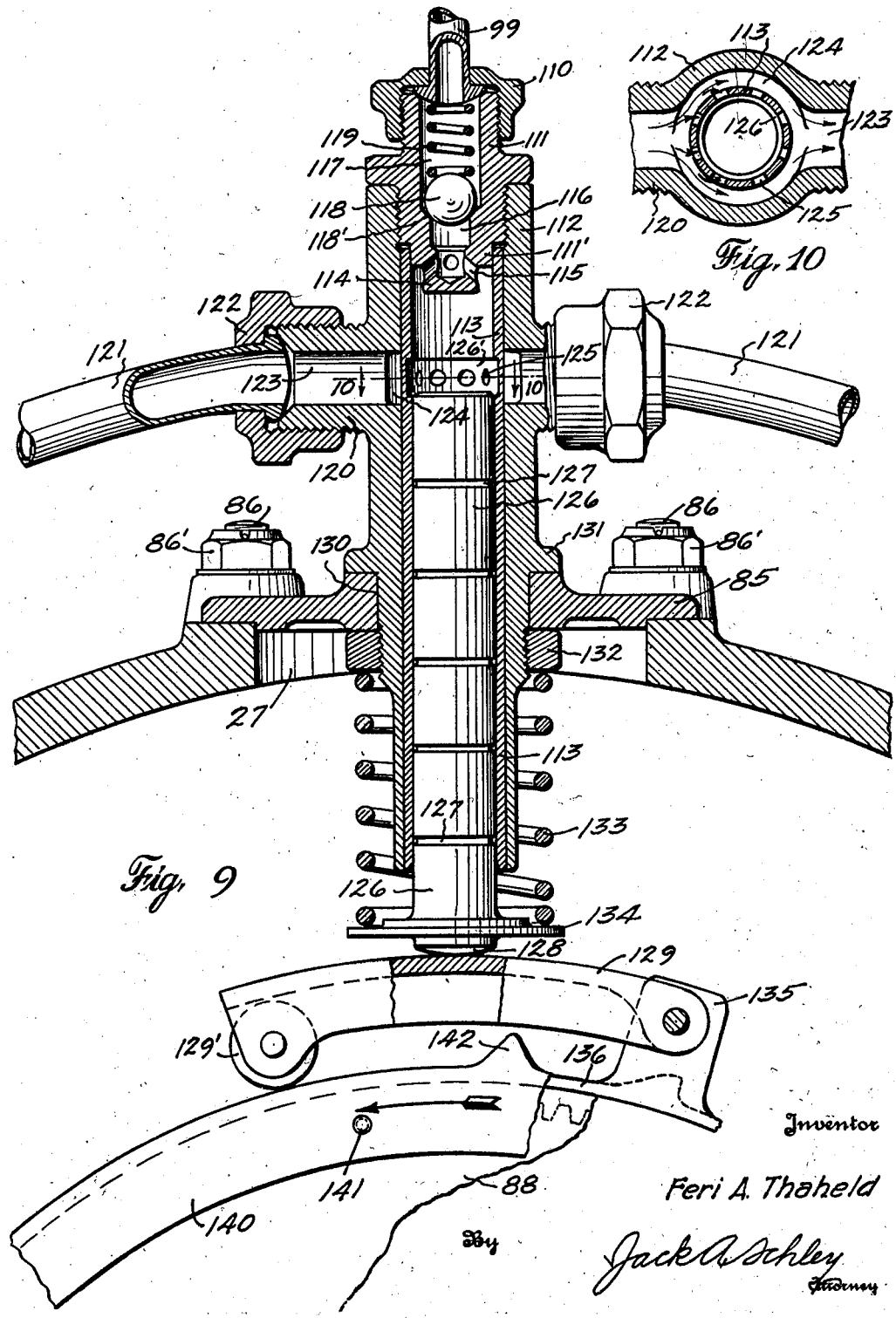

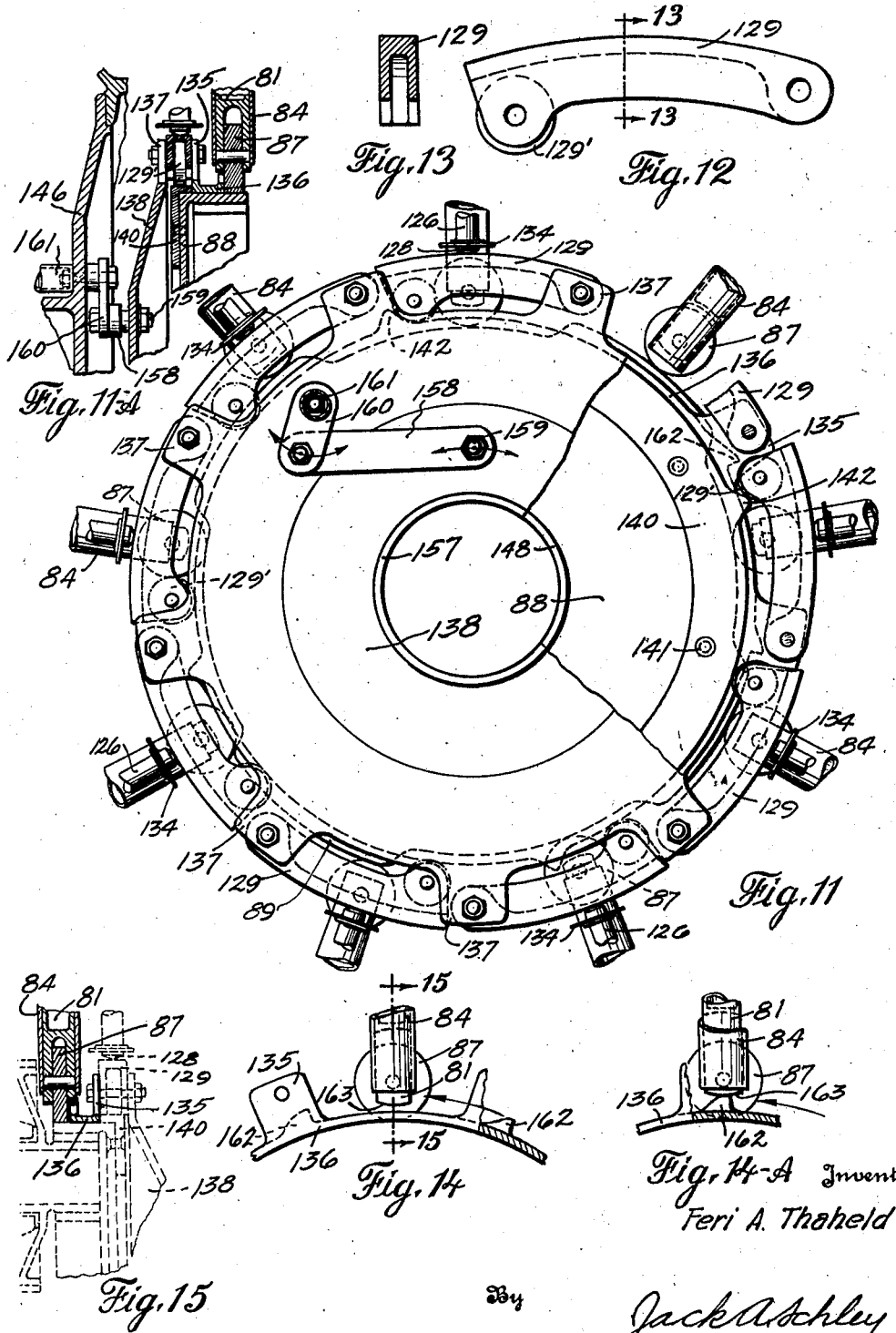

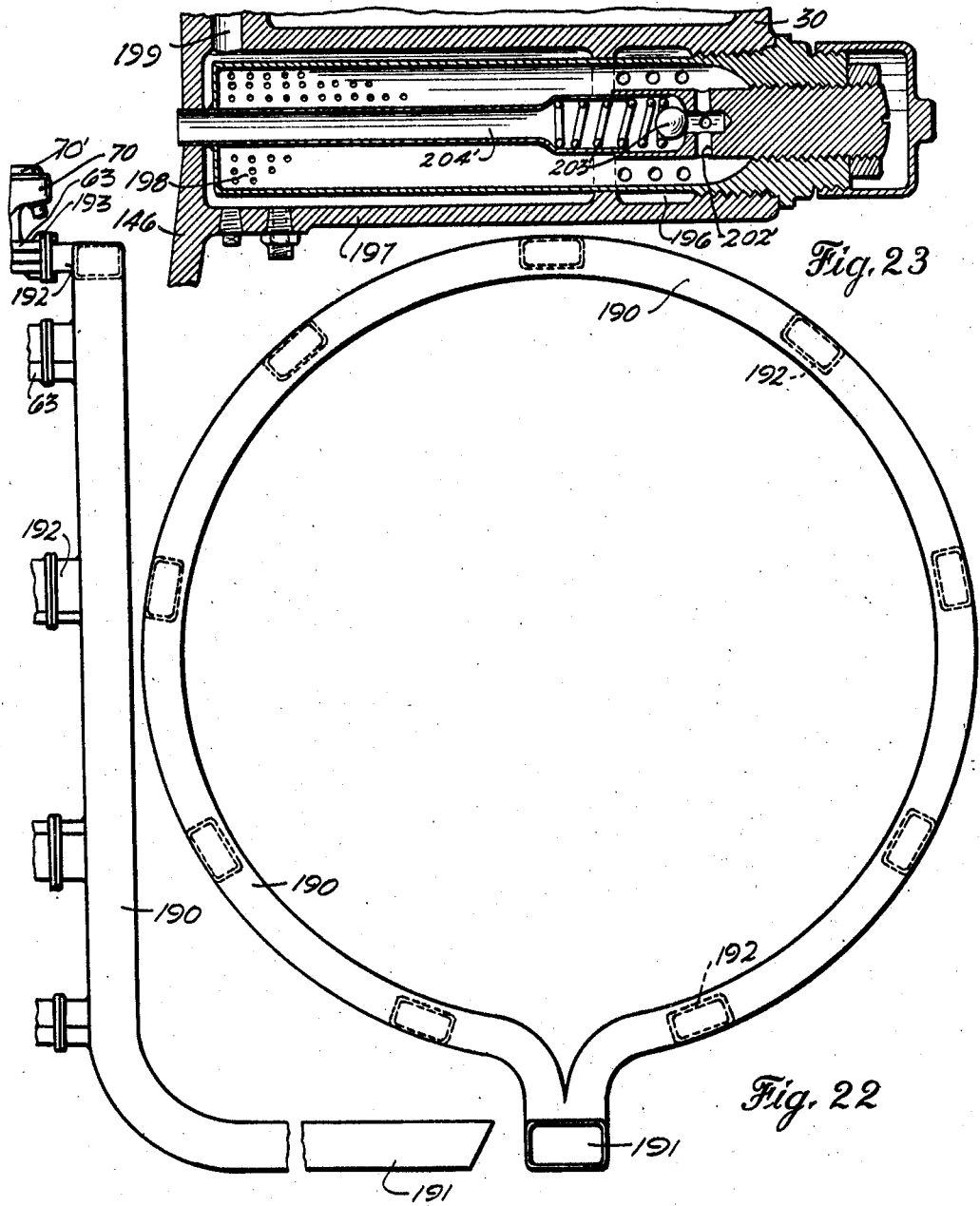

Patented May 24, 1932

1,859,541

UNITED STATES PATENT OFFICE

FERI A. THAHELD, OF DALLAS, TEXAS, ASSIGNOR, BY MESNE ASSIGNMENTS, TO GUIBERSON DIESEL ENGINE COMPANY, OF DOVER, DELAWARE, A CORPORATION OF DELAWARE

INTERNAL COMBUSTION ENGINE

Application filed April 7, 1930. Serial No. 442,316.

This invention relates to new and useful improvement in internal combustion engines.

One object of the invention is to produce an engine particularly adapted for use with aircraft involving certain fundamental and specific improvements and advantages.

A particular object of the invention resides in a new and novel controlling means for the fuel supply and the cylinder valves, whereby the operation of the engine may be adequately controlled and regulated.

A further object of the invention is to provide an improved form of fuel pump and fuel injector, whereby a more perfect combustion is obtained and fuel losses are reduced.

Another object of the invention is to provide each cylinder with a single valve serving both as an air inlet valve and an exhaust valve, thus m.. ing for simplicity and reduction in weight.

A still further object of the invention is to provide an improved air intake and exhaust outlet manifold on the head of each cylinder and also to shield the entrance port from the manifold to the cylinder, whereby air in passing through the manifold from the air intake will not suck out air from the cylinder or starve the latter when the valve is open.

Another object of the invention is to provide means for decompressing and exhausting air from the cylinders and preventing the injection of fuel, when it is desired to revolve the crank shaft without firing the engine, as where said shaft operates a propeller and it is desired to coast without operating the motor.

A further object of the invention is to provide a fuel pump actuating means designed to give a quack snap-like action to the pump, whereby the fuel is injected into the cylinder in a quick blast or spray, thus making for more efficient vaporizing.

Still another object of the invention is to provide valve tappet operating means and fuel pump tripping means tied together for simultaneous rotation, together with adjustable fuel pump operating means actuated by the tripping means, whereby the valve operation will maintain a fixed relation to the throw of the crank shaft, while the pump operation may be varied with relation to such throw to control the speed of the engine.

Another object of the invention is to provide an exhaust ring directly connected with the exhaust outlets of the manifolds, whereby a certain amount of back pressure is built up which tends to prevet the inrushing air from bypassing the cylinder ports and also aids in supplying the air to such ports.

An important object of the invention is to provide improved means for automatically adjusting the timing of the fuel injection in proportion to the quantity of the fuel injected, whereby the fuel charge is given a proper period to combust during the travel of the piston, thus making for highest fuel efficiency, easy and quick acceleration, clear exhaust and maximum speed attainments from given quantities of fuel.

Still another object of the invention is to provide a single control means for synchronously adjusting the fuel injector actuating means and the actuating means therefor, whereby the actuation of the injector is timed in harmony with the quantity of fuel injected and in relation to the position of the piston reciprocating in the cylinder.

A construction designed to carry out the invention will be hereinafter described together with other features of the invention.

The invention will be more readily understood from a reading of the following specification and by referecne to the accompanying drawings in which an example of the invention is shown, and wherein:

Figure 1 is a partial front elevation of an engine constructed in accordance with the invention, Figure 2 is a partial rear elevation of the same, Figure 3 is a vertical sectional view taken on line 3—3 of Fig. 1, Figure 4 is a vertical sectional view taken on the line 4—4 of Fig. 3, Figure 5 is a plan view of one of the cylinder heads with the rocker box cover removed, Figure 6 is a vertical sectional view taken on the line 6—6 of Fig. 5, Figure 7 is a partial vertical sectional view showing pump and valve operating means, Figure 8 is a vertical sectional view taken on the line 8—8 of Figure 7, Figure 9 is a vertical sectional view of a cylinder fuel pump and associated parts, Figure 10 is a horizontal cross-sectional view taken on line 10—10 of Fig. 9, Figure 11 is a partial rear elevation of the pumps and valve operating and controlling assembly, Figure 11—A is a vertical sectional view taken on line 11—A 11—A of Fig. 2, Figures 12 and 13 are detailed views of one of the pump operating levers, Figure 14 is a detail of one of the tappets and its operating means, Figure 14—A is a detail of the decompressing means.

Figure 15 is a view of the decompressing mechanism partly in section and partly in dotted lines.

Figure 16 is a detailed view partly in section and partly in elevation of the tappet operating cam disk and driving means.

Figure 17 is a vertical sectional view taken on the line 17—17 of Fig. 16 and showing in dotted lines a portion of the pump operating means.

Figure 18 is an elevation of the tappet and pump operating cam members.

Figure 21 is a side elevation of the exhaust ring showing connection with the manifolds, and Figure 22 is an elevation of said ring.

Figure 23 is a sectional view of the oil feed strainer and regulator.

Figure 1:
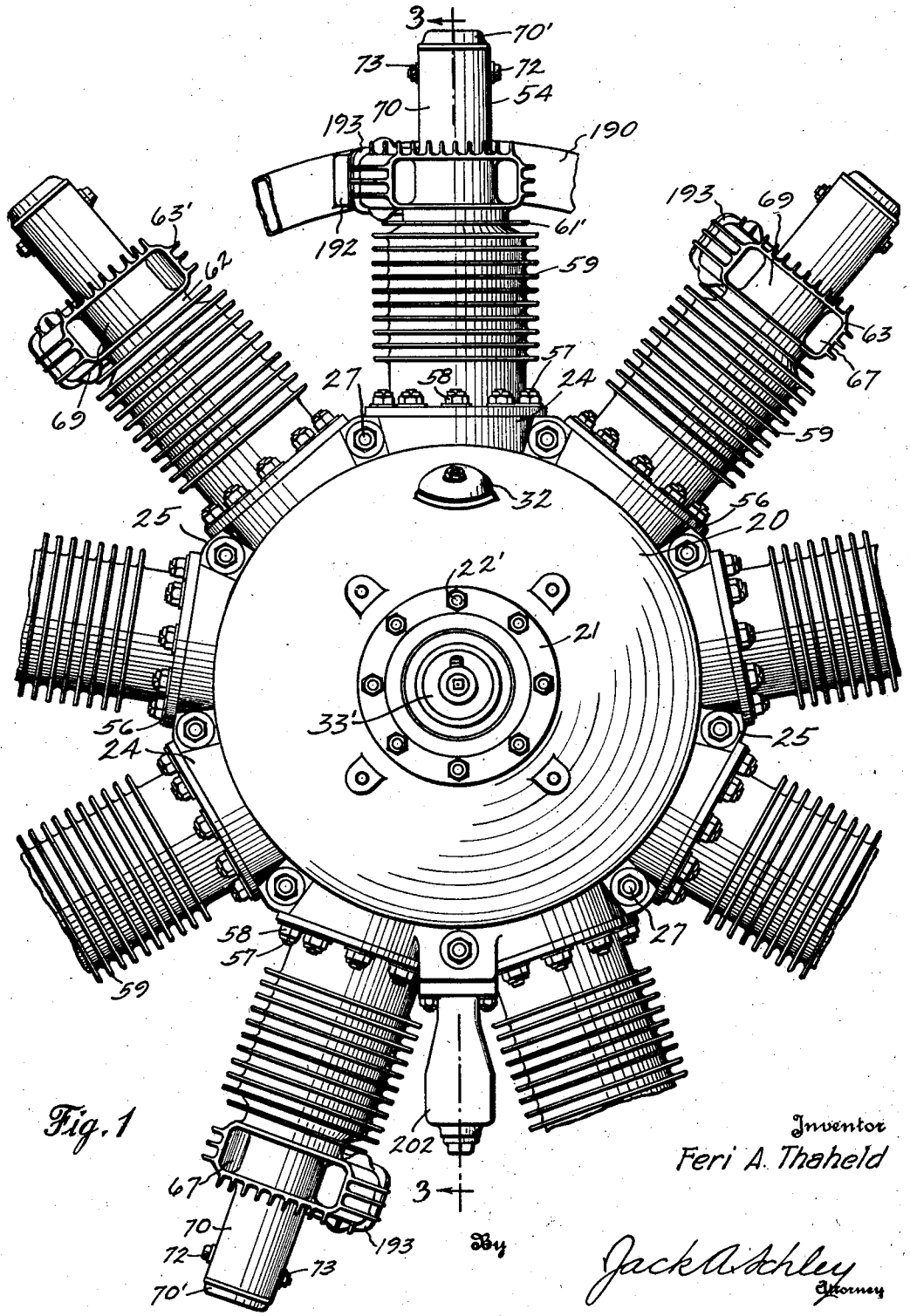

In the drawings the numeral 20 designates a split crank case, which is divided by transverse vertical partitions or spiders 20' and 21' (Figure 3) into a forward chamber A, a middle or central chamber B and a rear chamber C. The chamber A may be designated as a nose chamber and is preferably given a frusto-conical shape so as to offer less wind resistance. The central chamber might be designated as the main or crank chamber, while the chamber C might be called the cam or control chamber. In the operation of the motor it is necessary to keep these chambers partially filled with lubricating oil in order to lubricate the various elements, and for this reason suitable openings may be made in the partitions, which it is considered unnecessary to designate.

A thrust bearing 34 is mounted in the front end of the chamber A and confined by a housing 22 and a nose plate 21 fastened in place by stud bolts 22'. The partition 20' has an annular bearing seat 23 in which is mounted a crank shaft bearing 35 while the partition 21' (Figures 3 and 8) has a similar seat 26 receiving a like bearing 36. A hollow crank shaft 33 is mounted in the bearing and has a tapered shank 33' extending forwardly from the crank case for receiving a propeller or other element which it is desired to drive, and which is not shown. The chamber A of the crank case has a suitable breather 32 in its upper portion.

Figure 3:
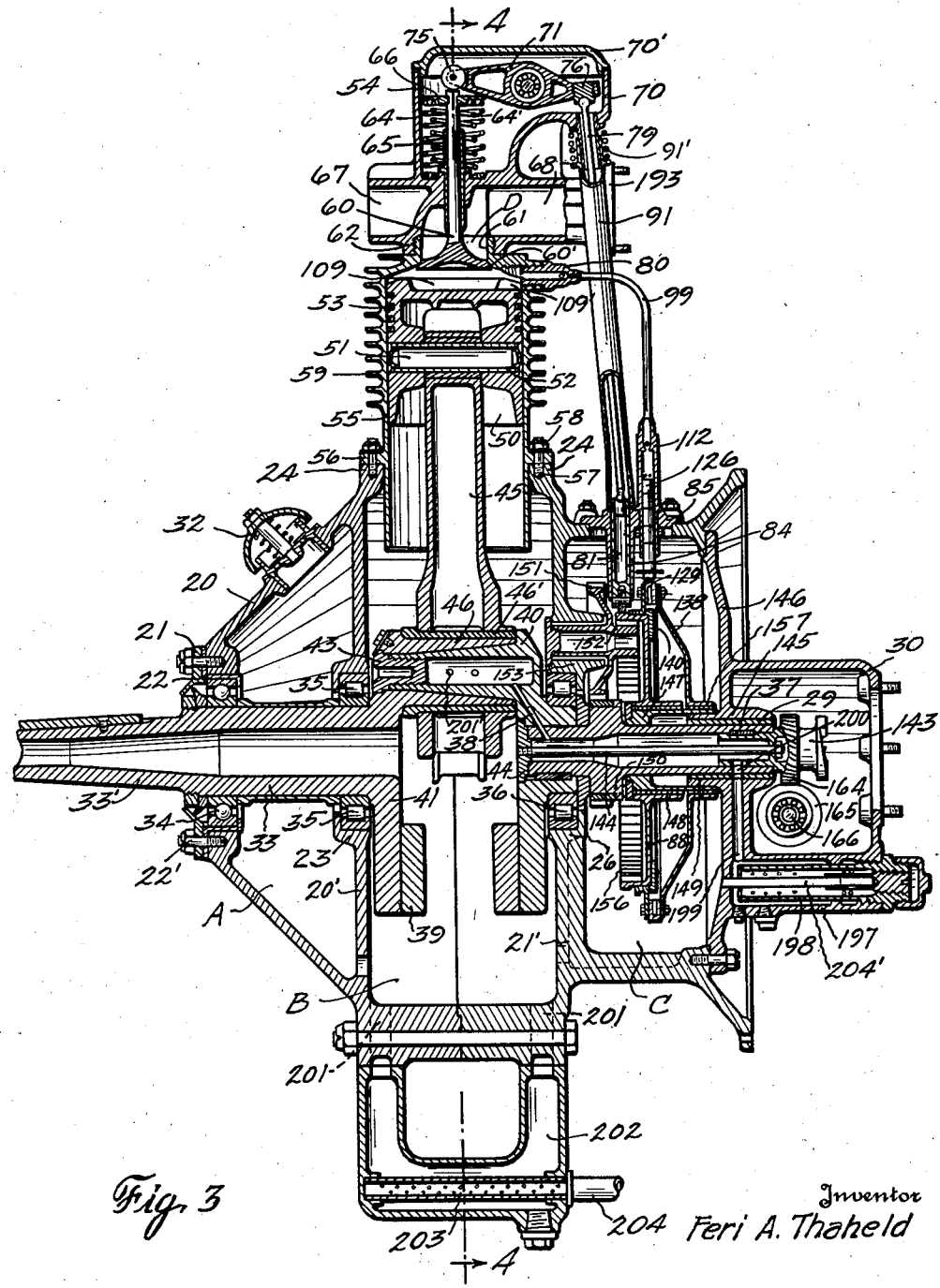
Figure 4:
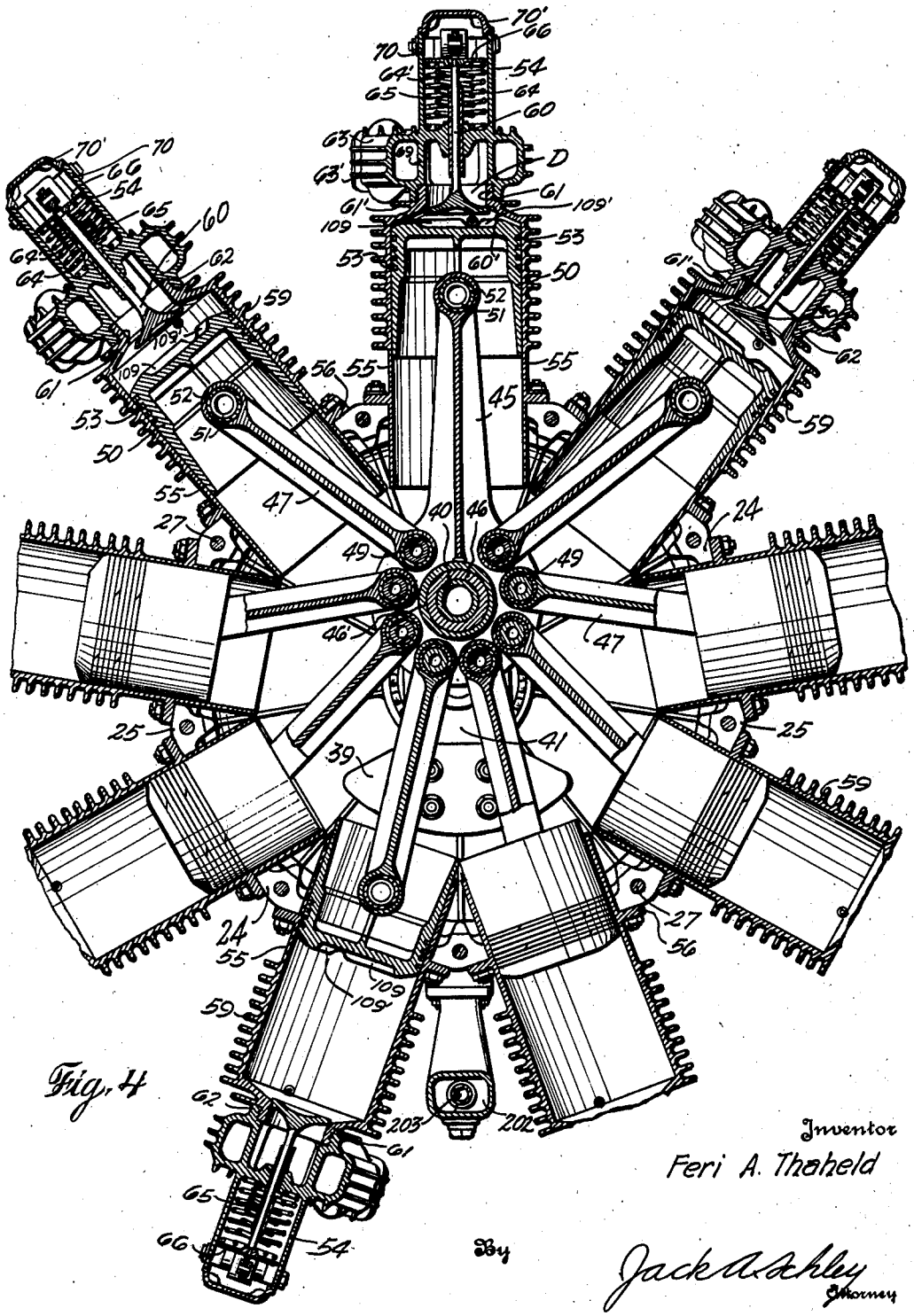

The annular wall of the crank chamber B is formed with radial collars 24 (Figures 1, 3 and 4, and as the crank case is split vertically such split is made to bisect these collars which are thus given a semicircular shape on each side of the split and connected by webs 25. The webs 25 are connected by bolts 27, whereby the sections of the crank case are securely united.

The crank shaft 33 is of the single-throw counter-balanced type and may be formed of metal suitable for the purpose. As is shown in Figure 3, the shaft is made in two portions and its crank or yoke is confined in the chamber B. This crank portion has the usual cheeks 41 carrying counterweights 39. The crank pin includes a hollow shank 40 carried by one of the cheeks, which is tapered so as to telescope a bushing member 46 carried by the other cheek. The shank is held in the bushing by a plug 43 (Figure 3) screwed into the shank and overhanging the bushing.

A bearing sleeve 46' is confined on the crank pin and receives the circular head of a master connecting rod 45. A plurality of articulated connecting rods 47 are pivoted on pins concentrically mounted on the head of the master rod around the crank pin or throw. The pins carry bushings 49 on which the rods are journaled. It will be noted that nine rods in all are shown as the engine illustrated is of the nine cylinder type; however, the invention is not to be limited to this particular number, which has been employed simply because nine cylinders have proven satisfactory.

Pistons 50 of suitable metal are mounted on the outer ends of the connecting rods, each piston having a wrist pin 51 passing through a bushing 52 secured in the outer end of the correlated rod, whereby the rod and piston are pivotally connected. Each piston has a plurality of rings 53, the number being optional. Each piston reciprocates in a cylinder 55, which is made of comparatively thin metal and has an annular hold down flange 56 (Figures 1, 3, 4, and 8) spaced outwardly from the inner end of the cylinder, whereby the inner end of each cylinder may project through one of the supporting collars 24 into the chamber B. The flanges are securely fastened on the collars by stud bolts 57 and nuts 58, suitable gaskets (not shown) of course being used. Each cylinder is provided with a plurality of circumferential radiating fins 59 disposed outwardly of its flange, which with the thin walls of the cylinders will adequately radiate or dissipate the excess of heat.

Figure 6:
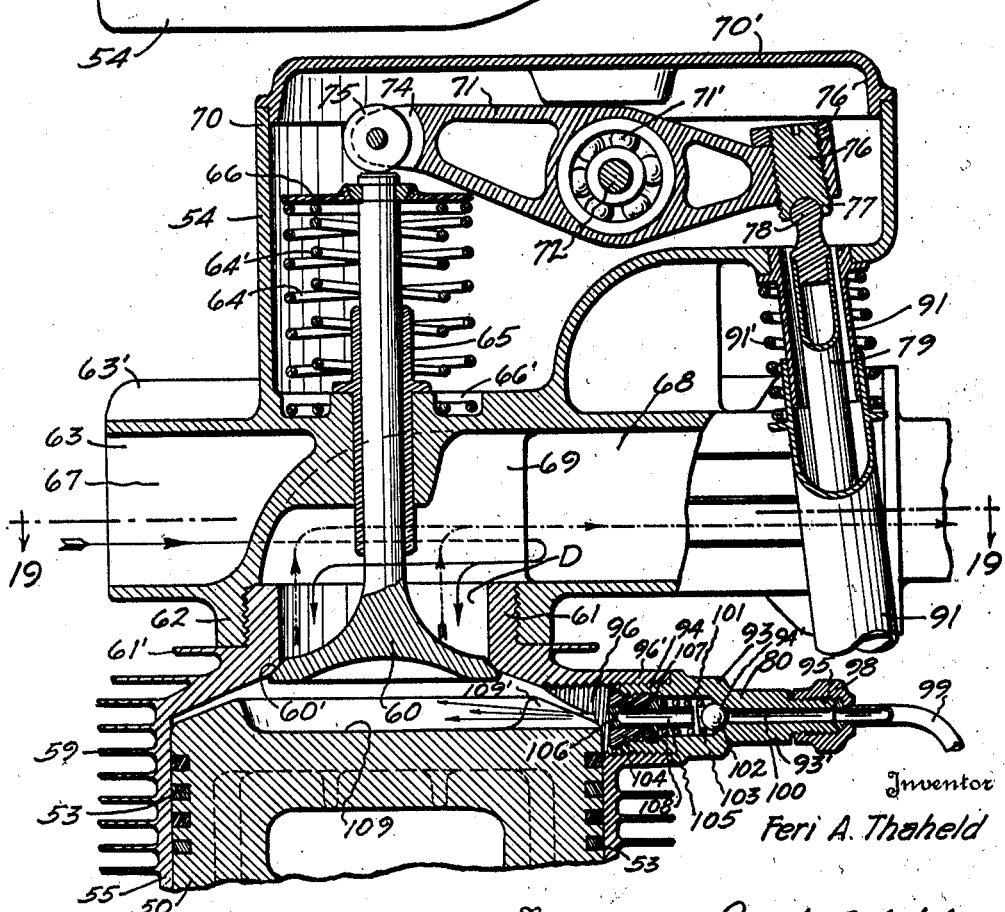

The outer end of each cylinder is given a frusto-conical shape, as is clearly shown in Figures 3, 4 and 6 and is also formed with an externally threaded collar 61, surrounded by a head flange 61'. One of the important features of the invention is the cylinder head 54, which is mounted on each cylinder. Each head has a depending internally screw-threaded collar 62 engaging on the collar 61 of its respective cylinder and fastened upon the flange 61'. An important feature of the invention is the employment of a single valve 60 for each cylinder, whereby the collar 61 constitutes both an intake and an exhaust port D. The valve 60 in each instance is of the usual shape and engages a seat 60' at the bottom of the collar 61.

Figure 5:
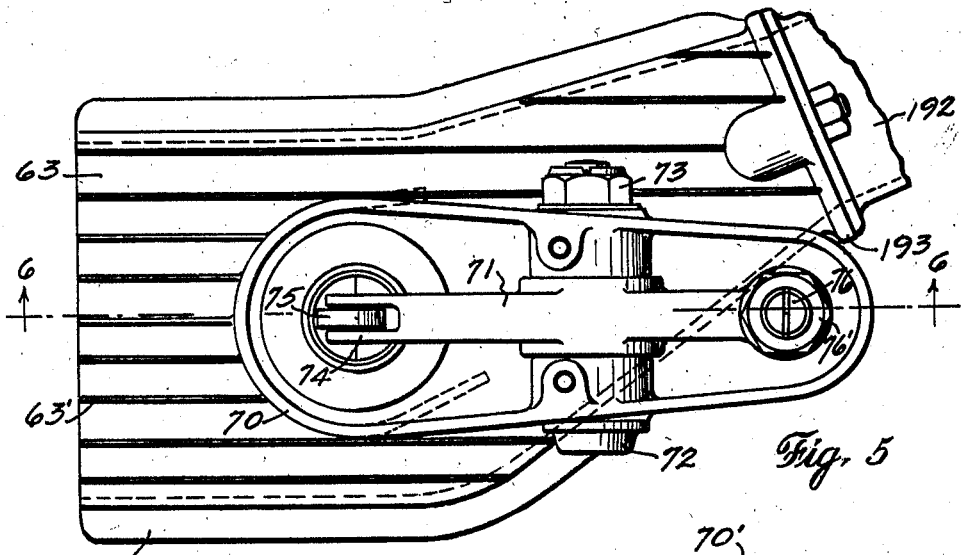
Figure 19:
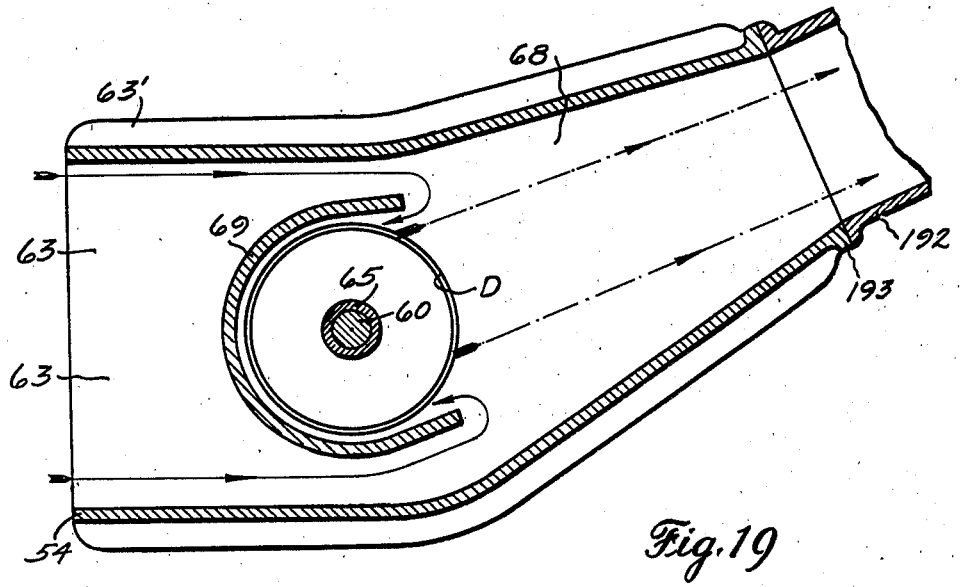
Figure 19 is a horizontal cross-sectional view of one of the manifolds taken on the line 19—19 of Fig. 6.

As is best shown in Figures 5, 6 and 19, each head is formed with a transverse horizontal manifold 63 which has external radiating fins 63' extending longitudinally thereof and in the general direction of the longitudinal axis of the crank shaft, so as to form air channels when the engine is moved forwardly. Each manifold has its forward end open, which provides an inlet to an air intake chamber 67, while its rear end is open to form an outlet or an exhaust chamber 68. A hood or deflector 69 is interposed between the chambers so as to overhang the combination intake-exhaust port D and is open rearwardly to the exhaust chamber.

As is shown by arrows in Figures 6 and 19, air entering the chamber 67 is deflected by the hood 69 and caused to pass around each side thereof before entering the latter. This air is drawn in to the rear side of the hood and down through the port D into the cylinder. The exhaust from each cylinder passes out through the said port D and is discharged rearwardly from the hood 69 into the chamber 68 from which it escapes.

Each hood supports an upright guide sleeve 65 in which the stem of the valve 60 is slidably mounted. Two concentric valve springs 64 and 64' under tension surround the valve stem and rest in a sump 66' in the top of the manifold 63. The upper ends of the springs engage a washer 66 removably mounted on the upper end of the stem.

On top of the manifold 63 each head includes an elongated rocker box 70 integral therewith and slightly overhanging the manifold at its rear end. Each box has a removable cover 70'.

Rocker arms 71 (Fig. 6) each have ball bearing mountings 71' on supporting pins 72 which are secured through the rocker box by nuts 73. Each arm has one of its ends 74 yoked for the mounting therein of a roller 75, which engages the end of the valve stem for depressing the same. The opposite end of each rocker arm carries an adjusting screw 76 and lock nut 76'. The screw has a ball socket 77 for receiving a ball head 78 on the outer end of a push rod 79. The push rod (Figs. 3 and 8) has connection at its inner end with a valve tappet 81 by means of a ball head 82 on the inner end of the rod and a ball socket 83 in the tappet.

Figure 2:
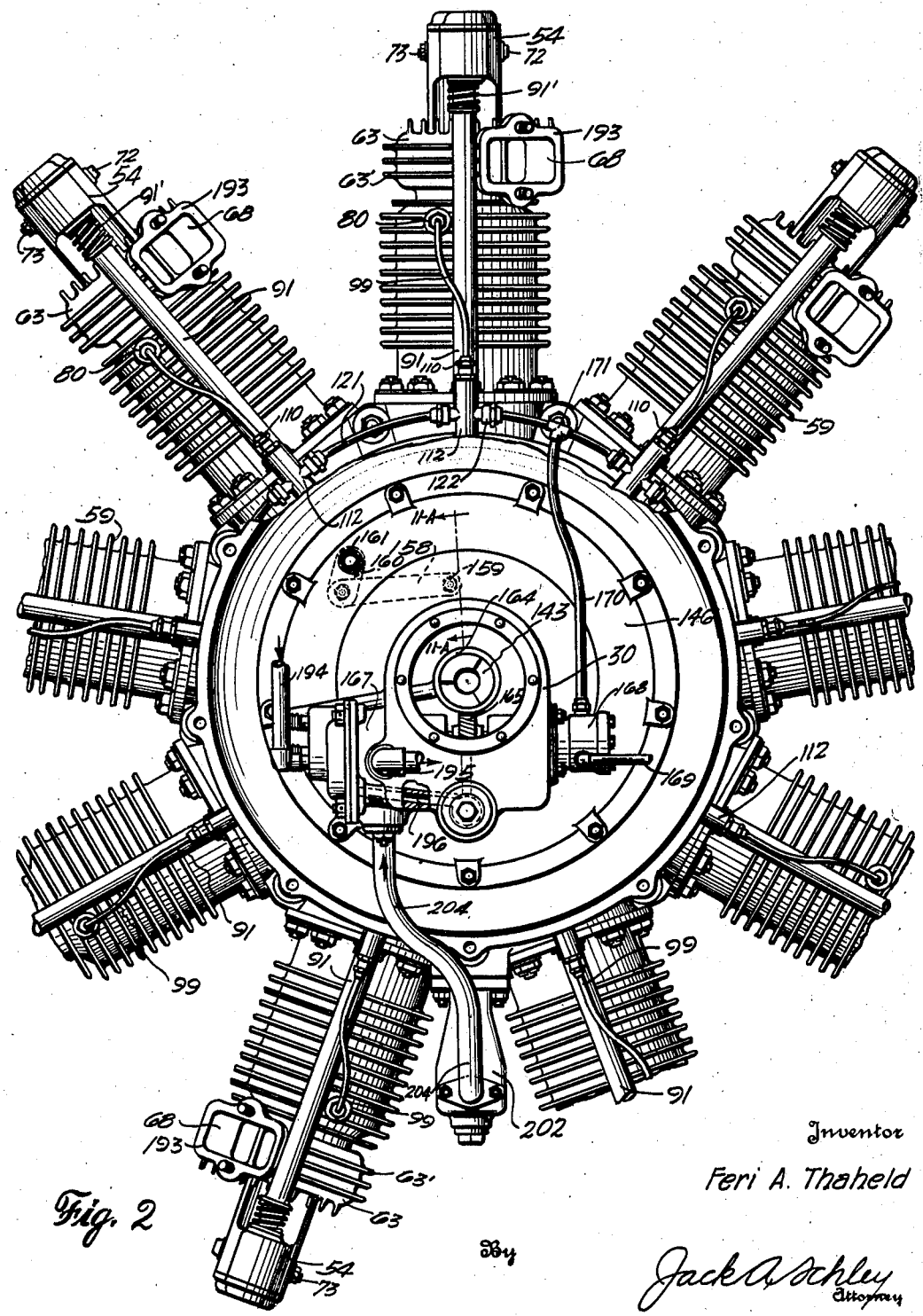

The control chamber C has opposite each cylinder 55, a port 27 which is closed by a cap 85. The tappet rides in a guide sleeve 84 extending through an integral with the cap which is secured by studs 86 and nuts 86' to the chamber C. A roller 87 is mounted in the inner end of the tappet and rides on the annular flange 88' of a cam disk 88 (Figs. 8, 16 and 17) in the path of cams 89 equally spaced on the periphery of said disk. The cam disk is rotatably mounted and as it rotates the cams 89 lift the valve tappet rollers and valve tappets, thereby pushing the rods 79 outwardly and actuating the rocker arms 71. The rocker arm rollers 75 depress the valve stems against the compression of the springs 64 and 64' thus opening the valves. As the valve tappet rollers 87 ride off of the cams 89 the valves are closed by the expansion of the springs. It will be noted that the lift of the valves 60 is regulated by the adjusting screws 76 of the rocker arms. The push rods are enclosed by telescopic tubular covers 91 held in place between the rocker boxes 70 and the sleeve 84 by springs 91' (Figs. 2, 3 and 6).

Fuel is supplied to the firing chamber formed between the piston 50 and the outer end of each cylinder, by means of a fuel spray plug 80 (Figs. 2, 6, 7 and 8). Each plug includes a head 93 and a reduced shank 93'. A screw threaded nipple 94 on the outer end of the head is screwed into a boss 96' projecting from the side of the cylinder at its outer end. A fuel port 96 extends through the boss into the firing chamber.

The shank 93' has a screw threaded nipple 95 on its outer end screwed into a union 98 connected with a fuel pipe 99. The shank has an axial bore 100 discharging into a counter bore 101 in the head 93. A ball check valve 102 is held against its seat 94' at the end of the bore 100 by a coiled spring 103 (Fig. 6). A bushing 104 screwed into the nipple 94 receives a nozzle 105 which is provided with a reduced discharge port 106. The nozzle has an annular flange 107 which is secured between a shoulder 108 within the bore 101 and the bushing. The nozzle extends inwardly and telescopes the spring 103.

Figure 20:
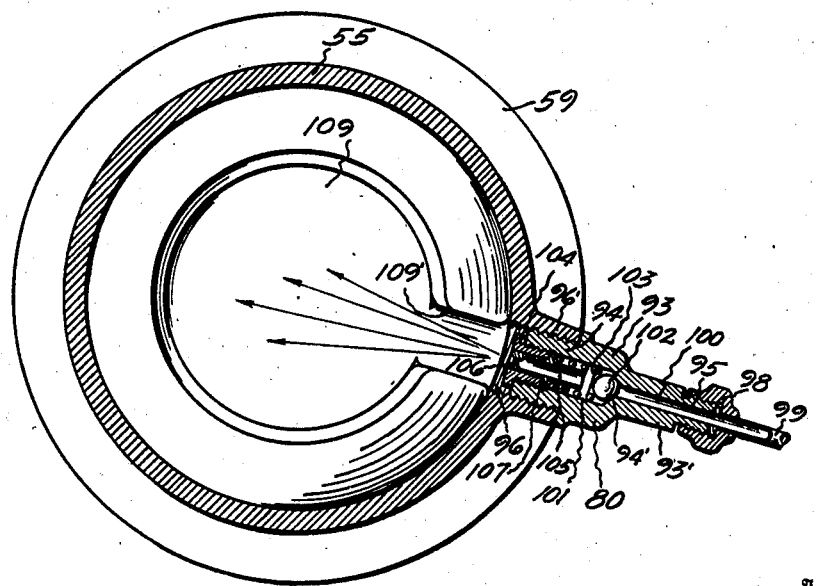
Figure 20 is a plan view of one of the piston heads.

Fuel is supplied under high pressure (a pressure greater than the pressure within the cylinder at the moment of fuel injection), as will hereafter be explained, through the plug 80 and pipe 99. The fuel is sprayed through the reduced port 106 of the nozzle at a relatively high velocity. Each piston 50 has a sump 109 (Fig. 20) in the outer surface of its head provided with a radial groove 109'. When the piston is at the outer end of its stroke the groove registers with the fuel port 96.

The opposite end of the fuel pipe 99 is connected by a union 110 (Figs. 2, 7, 8 and 9) to a nipple 111 which is screwed into one end of a fuel pump 112. The pump barrel 112 extends through an opening 130 in the cap 85 and is secured thereto by an enlarged annular collar 131 on the pump 112 and a nut 132 screwed onto said pump.

The nipple has a reduced shank 111' telescoping into a liner 113 extending axially of the pump. The nipple also has a reduced neck 114 provided with a plurality of ports 115 inclined radially of the neck and opening into an axial bore 116. The bore 116 opens in a valve chamber 117 in which a ball check valve 118 and spring 119 are confined between the end of the pipe 99 and a valve seat 118' for normally closing the bore 116.

The pump 112 has a pair of threaded nipples 120 extending at right angles from opposite sides thereof for connection in a fuel line 121 by unions 122. This fuel line surrounds the crank case. Each nipple has a bore 123 beveled at its outer end opening into an annular groove 124. This groove 124 provides a circular passage for the fuel fluid which will be introduced into the liner 113 through ports 125 in the wall thereof. The liner has an internal circular channel 126' connecting the ports.

A fuel plunger 126 having a close sliding fit in the liner 113 is provided throughout its length with a plurality of spaced annular grooves 127. Any fuel fluid which may seep between the plunger and the liner will collect in these grooves and serve both as a lubricant and as a seal ring for said plunger. The outer end of the plunger is normally substantially flush with the inner edge of the channel 126' (Fig. 9). The inner end of the plunger has a convex boss 128 which rides upon the face of an actuating lever 129. A coiled spring 133 bearing on a flange 134 at the inner end of the plunger surrounds the inner end of the pump and holds the plunger in contact with lever 129.

The springs 103 and 119 are under sufficient tension to resist the static pressure of the fuel fluid in the pipes 99 and the line 121. Upon operation of the pump in each instance, the fuel pressure in the pipe 99 will be built up to a point where it will overcome the tension of the spring 103 and unseat the valve 102. The fuel will spray through the port 106 of the nozzle 105 under such pressure and velocity as to overcome the pressure of the compressed air in the firing chamber of the cylinder 55. The fuel fluid will be projected in a jet through the groove 109' into the sump 109 of the piston head.

The sizes and areas of the fuel supply elements are such that a single stroke of the pump plunger 126 will displace sufficient fuel fluid from the upper end of the pump liner 113 through openings 115, 116 and 117 into the pipe 99 to not only increase the pressure in the pipe, but to unseat the valve 102 and eject a spray of fuel into the cylinder. For actuating the plunger 126 the lever 129 is operated. Each lever is pivoted between a lug 135 on a decompression ring 136 and a lug 137 carried by a dished plate 138 within the control chamber C as is best shown in Figs. 7, 8 and 9.

A cam ring 140 is interposed between the ring 136 and the plate 138 (Fig. 8). The decompression ring 136 is rotatably mounted on the flange 88' of the cam disk 88 and the cam ring is securely fastened to the cam disk by rivets 141. Each pump lever 129 (Figures 9 to 13) has a roller 129' on its outer end riding upon the face of the cam ring 140 in the path of cams 142 on said face. The cams are pointed with steep inclines on each side so as to cause a rapid ascent and descent of the lever rollers, which results in a sharp quick swing of said levers and a snap-like reciprocation of the pump plungers 126. This operation produces a penetrating jet or spray of fuel fluid from the port 106 of the plug 80.

The crank shaft 33 has an axial tubular extension or stub shaft 37 telescoped into its trunnion which is keyed in the crank shaft, as is best shown in Figures 3 and 8. The clutch head 143 telescopes into the outer end of the shaft 37 and is held therein by a tie bolt 144, which is screwed into a flanged nut 44 seated in one of the cheeks 41 of the crank shaft. The shaft 37 rotates in a bearing sleeve 29 mounted in the hub 145 of a rear cover plate 146, which is suitably bolted to the rear of the control chamber C of the crank case.

The shaft 37 has journaled thereon a bearing sleeve 147 on which the hub 148 of the cam disk 88 is journaled as is best shown in Figures 3 and 8. The sleeve 147 is telescoped by a collar 149 surrounding the bearing 29 and said sleeve is held against longitudinal displacement by the cover plate 146 and a pinion 150 integral with the shaft 37. The pinion 150 drives a gear 151 (Figures 3, 8 and 17) which has a tubular shaft 152 journaled in a bearing housing 153 (Figure 8) projecting into the chamber C from the partition 21'. The tubular shaft 152 has a flanged cap 154 screwed into its end and overhanging one end of the housing 153. On the opposite end of the tubular shaft is formed a pinion 155, as is best shown in Figures 8, 16 and 17. The pinion meshes with an integral ring gear 156 formed on the inner side of the flange 88'.

It will be seen that when the crank shaft 33 is revolved the shaft 37 will also be revolved, thus imparting rotation to the gear 151 by means of the pinion 150. This will rotate the cam disk 88 by means of the pinion 155 and gear ring 156. The cam disk 88 and the cam ring 140 being tied together will thus be caused to revolve. When the cam disk and cam ring are revolved the cams 89 (Figures 16 and 18) will engage the rollers 87 and displace the tappets 81 outwardly, while the cams 142 will engage the rollers 129' and actuate the levers 129, whereby the plungers 126 of the pumps 112 will be actuated.

The dished plate 138 (Figure 3) has a hub 157 journaled on the sleeve 147. For shifting this plate, together with the decompression ring 136, which is attached thereto, I provide a link 158 (Figures 11 and 11A). This link is pivoted to a stud 159 on the plate 138 and at its opposite end has pivotal connection with an arm 160 fastened at its opposite end on an adjusting shaft 161 journaled in the cover plate 146. It will be seen that by rotating the shaft 161 the arm will swing the link and thus rotate the dished plate. The dished plate through its lugs 137 and the lugs 135 (Figures 7 to 18, inclusive) will rotate the decompression ring 136.

By swinging the shaft 161 in a clockwise direction (Figure 11) the plate 138 will be moved in a counter-clockwise direction (Figures 7, 9 and 11). This will cause cams 162 (Figures 14 and 15) carried by said ring to ride under curved shoes 163 on the inner ends of the tappets 81 and displace the same outwardly, whereby all the valves 60 will be opened and so held as long as the adjustment is maintained. This will prevent compression of the air in the cylinders and will eliminate firing. In order to prevent actuation of the fuel pumps, the levers 129 are also moved by the lugs 135 and 137 so that the pivot points of said levers rest directly under the bosses 128 of the pump plungers 126, and consequently when the levers are tripped by the rotating cams 142, the pump plungers will not be operated sufficiently to force fuel into the pipes 99; thus during the decompression operation no fuel will be supplied to the cylinders.

One of the features of the invention is the simplicity of control. It is obvious that by adjusting the plate 138 in either a clockwise or counter-clockwise direction (Figures 7, 9 and 11) the distance of the bosses 128 from the pivots of the levers 129 will be increased or decreased, thus changing the leverage and consequently varying the plunger stroke when said levers are operated by the cams 142. By swinging the control shaft 161 in a counter-clockwise direction (Figure 11) the plate 138 will be moved in a clockwise direction, which will increase the leverage and thus cause a longer plunger stroke, whereby a greater quantity of fuel will be delivered to each cylinder and the speed of the engine accelerated. This will slip the rollers 129' in a clockwise direction, whereby they will earlier be engaged by the cams 142, thus advancing the timing of the firing. A reverse adjustment will reduce the leverage as well as the plunger stroke and retard the timing, thus cutting down the fuel charge and speed of the engine.

A starter housing 30 is formed integral with the cover plate 146 and contains the clutch head 143. This clutch head is adapted to be connected with a suitable starter in the usual manner and it is not considered necessary to enter into a description of the same. The clutch head has a spiral gear 164 integral therewith (Figures 2 and 3) and this gear drives a similar gear 165 mounted on a transverse shaft 166 in the housing 30. The gear 165 and shaft 166 are employed to drive an oil pump 167 and a fuel pump 168 suitably attached to the housing (Figure 2). These pumps may be of any suitable construction, form no particular part of the invention, and may be purchased in the open market.

The fuel pump 168 has a fuel supply line 169 leading from a suitable storage source. A fuel feed pipe 170 leads from the pump to a T 171 which is connected in one of the distributor pipes 121. It will be noted that by reason of the grooves 124 in the pump barrels 112 that the liquid fuel may flow continuously from one pipe 121 to the next pipe through the pump cylinders, as well as flowing through the ports 125 into the liners of the pump. By this arrangement each pump is adequately supplied, but other pump connections may be made if desired.

It is not believed necessary to go into the details of the lubricating system as practices well known in the art are used. However, the pump 167 has connection with a suitable oil reservoir (not shown) by means of pipes 194 and 195 (Figure 2) which provide for a constant circulation and by passing of the oil from and to the tank. A duct 196 (Figure 2) leads to an oil barrel 197 (Figures 2, 3 and 23) on the bottom of the housing 30. The oil is delivered into a cylindrical screen 198 in the barrel and flows from the screen to a duct 199 located to register with a port 200 in the stub shaft 37 so that during the revolution of said shaft, oil is injected into the same through the port. The shaft 37 is hollow and a duct 38 leading from said shaft through the wall of the shank 40 delivers oil to the latter. Ports 201' extend through the crank shaft from the shank 40 for lubricating the master rod 45.

When the barrel 197 and screen 198 are filled with oil and sufficient back pressure is developed, said oil will enter ports 202' (Fig. 23) and unseat a spring pressed ball valve 203'. This will permit the oil to flow through a tube 204' and discharge into the chamber C of the crank case.

The oil is drained by ducts 201 into a reservoir 202 bolted to the bottom of the crank case and removable therefrom. A cylindrical screen 203 mounted in the bottom of the reservoir is connected with the pump by a return pipe 204.

In Figures 21 and 22 I have shown a circular exhaust conductor ring 190 having a discharge shank 191 at the center of its bottom. This ring is formed with flanged inlet collars 192 located so as to be fastened to flanges 193 (Figures 1, 2, 5, 17 and 21) on the exhaust ends of the manifolds 63. It will be noted that the manifolds and the exhaust ring are directly connected and no air gaps or spaces are left therebetween. Air entering the chamber 67 will be deflected by the hoods 69 to each side of each manifold. This air will meet a certain resistance from the gases discharged into the exhaust ring and, therefore, will not rush through the manifolds or pull out air from the cylinders. Air which is drawn into the cylinders through the ports D will be sucked in around the rear sides of the hoods. The back pressure which is built up in the exhaust ring will tend to force the air into the cylinders, thus aiding in charging the same.

In operating the engine suitable fuel oil is supplied from a source not shown through the pipe 169 to the pump 168, from which it is distributed by the pipe 170 to the pipes 121, as is shown in Figure 2. The oil bypasses the individual pumps 112 by flowing through the nipples 123 and grooves 124 (Figures 7 and 9) around the liners 113. In this manner fuel oil is supplied to each pump. A suitable starter (not shown) is engaged with the clutch head 143 so as to revolve the crank shaft 33, whereby the pistons 50 are reciprocated in the cylinders 55 and the cam disk 88 is revolved, it, in turn, revolving the cam ring 140. By this means the pumps and the valve are operated as hereinbefore described.

The engine is operated on the four-cycle principle. Upon the first downward stroke of the piston the valve 60 thereof is opened, whereby air is drawn into the cylinder. On the first upward stroke of the piston the air is compressed and when the piston reaches the upper end of its stroke the fuel pump is operated so as to spray in a jet of vaporized fuel from the plug 80 (Figures 2, 6, 7 and 8). The heat of compression is sufficient to explode the charge and force the piston downward thus imparting its power stroke. Upon the next upward stroke of the piston the valve 60 is opened and the cylinder exhausted. The principle of operation of the Diesel engine is well understood and it is not thought necessary to give a minute description.

It is pointed out that the shaft 161 provides a single control common to all the regulating parts and this makes for simplicity. By rotating said shaft, the plate 138 is rotated in either direction so as to advance or retard the firing or to open the valves and decompress the cylinders. The shielded air inlets make for a more positive charge and prevent starving of the cylinders. The attaching of the exhaust ring directly to the exhaust outlets of the manifold makes for economy and efficiency in operation.

It is obvious that the greater the quantity of fuel injected the longer the burning or combusting time required and the higher the speed developed. From this it follows that if the burning or combustion period during the compression stroke of the piston is the same or substantially so, for all quantities of fuel injected, then there will be conditions at certain speeds due to the quantities of fuel injected, when either too long or too short a combustion or burning period will be given; consequently the motor will show too much impact or torque at low speeds and late firing at extreme high speeds or speeds above the set timing, thus making for poor combustion, inefficiency and smoking of the exhaust.

By the arrangement herein set forth the timing is automatically and instantaneously changed in proportion to the variations in the quantities of fuel injected. Where the engine is operating at its high speed a greater quantity of fuel is being injected at each charge than when it is operating at a low speed. When the plate 138 is shifted in a clockwise direction (Figs. 7, 9 and 11) each lever 129 is so moved as to bring the boss 128 nearer the outer end of the said lever, thus increasing the travel of the pump plunger 126. Thus the further the lever is moved the greater the quantity of fuel injected.

As the lever is adjusted clockwise its roller 129' is constantly brought closer to the cam 142 in the order of rotation of said cam and said cam being moved in fixed relation to the travel of crank shaft and its piston, the earlier in the compression stroke of the piston, the fuel charge will be injected.

If the plate 138 is moved in a counter clockwise direction (Figs. 7, 9 and 11) the reverse condition is brought about, whereby the plunger stroke is shortened and the timing is retarded.

It is obvious from the foregoing that a larger charge of fuel will not burn as quickly as a small charge of fuel and consequently the larger the fuel charge the longer the burning or combustion portion of the compression stroke of the piston which will be required. Conversely, the smaller the fuel charge the shorter the combustion or burning portion of the compression stroke of the piston which will be required. Referring to Fig. 9, it is pointed out that fuel is injected while the roller 129' is riding up the inclined surface of the lug 142. The plunger 126 has contact with the lever 129 and the nearer this point of contact is to the pivot lug 137 (Figs. 7 and 11), the shorter will be the swing of said lever and also the shorter will be the stroke of the plunger 126. When the boss 128 is quite close to the lug 135 the roller 129' will climb a portion of the lug 142 before there has been sufficient travel of the plunger 126 to inject any fuel, but on the other hand if the boss 128 is near the outer end of the lever 129 the swing of said lever will be increased and consequently the plunger travel will be increased, whereby the injection period will be prolonged. The cam ring 140 is initially fastened in place and it has a definite fixed relation to the throw of the crank shaft.

The automatic synchronizing of the quantity of fuel and the timing of the fuel injection, results in a proper combustion of the fuel by giving it the exact time during the compression stroke of the piston, necessary for such combustion, therefore smoking is eliminated and undue shocks, torsional strains and delayed firing are avoided and a more efficient and smoother running engine is provided. This engine may be throttled down to a low speed and quickly accelerated to a high speed.

What I claim, is:

1. In an engine of the character described, a plurality of cylinders, a valve for each cylinder, means for operating the valves, a fuel pump for each cylinder, a plunger for each pump, pivoted operators for the plungers, revolving means periodically engaging the operators, a support to which the operators are attached, and means for adjusting said support to simultaneously vary the stroke of said plungers and the time of fuel injection.

2. In an engine of the character described, a plurality of cylinders each having an air inlet and a valve therefor, a piston operating in each cylinder, means for opening and closing each valve, means for setting the valve operating means to hold all valves open and decompress the cylinders, pumps for supplying fuel to each cylinder, operating means for said pumps and means for making said pump operating means substantially dormant when the decompressing means is operated.

3. In an engine of the character described, a plurality of cylinders each having a fuel inlet, a pump for each cylinder having connection with the fuel inlet thereof, spring pressed plungers extending from said pumps, a support, operating levers all pivoted on said support and engaging the pump plungers, and revolving means for tripping said levers to actuate said pump plungers and means for adjusting said support to simultaneously vary the stroke of the plungers and the time of fuel injection.

4. In an engine of the character described, a plurality of cylinders each having a fuel inlet, a pump for each cylinder having connection with the fuel inlet thereof, spring pressed plungers extending from said pumps, a support, operating levers pivoted on said support and engaging the pump plungers, revolving means for tripping said levers to actuate said pump plungers, and means for adjusting the support to vary the point of contact between the levers and plungers, whereby the actuation of the pump plungers is varied.

5. In an engine of the character described, a plurality of cylinders each having an air inlet and a valve for opening and closing said inlet, a piston operating in each cylinder, means for operating the valves including tappets, revolving means for periodically operating the tappets, an adjustable support, a decompressing member attached to the support and having elements for displacing the tappets to hold all of the valves open, fuel pumps connected with the cylinders, plungers operating in said pumps, operators for the plungers carried by the support, and a common operating means for the support whereby it may be adjusted to vary the plunger stroke for controlling the speed of the engine and for operating the decompression member and rendering the pump operating means inactive.

6. In an engine of the character described, pump and tappet operating means including a revolving cam disk having spaced cams for actuating the tappets, a rotatable supporting member, pump plunger operating levers carried by the support, a revolving ring having lugs for tripping the levers, a control shaft, an arm connected with the shaft and swung thereby, and a connection between the arm and the support for rotating said support when the arm is swung.

7. In an engine of the character described, pump and tappet operating means including a revolving cam disk having spaced cams for actuating the tappets, a rotatable supporting member, pump plunger operating levers carried by the support, a revolving ring having lugs for tripping the levers, a control shaft, an arm connected with the shaft and swung thereby, a connection between the arm and the support for rotating said support when the arm is swung, and a decompression ring having cams for displacing the tappets and connected to the support for rotation thereby.

8. In an engine of the character described, a cylinder having a fuel inlet and an air inlet and an exhaust outlet, a crank shaft, a piston working in the cylinder and connected to the crank chaft, valve means for controlling the inlet of air and the exhaust of gases from the cylinder, means for actuating the valve means in relation to the throw of the crank shaft, means for injecting fuel into the cylinder against the pressure therein, means for actuating the injecting means, means for tripping the actuating means, and a single means for adjusting the actuating means for varying the operation of the injection means to vary the quantity of fuel injected and to change the relation of the tripping means to the actuating means to alter the timing of the fuel injection with relation to the throw of the crank shaft.

9. In an engine of the character described, a cylinder having a fuel inlet, a crank shaft, a piston reciprocating in the cylinder and connected with the crank shaft, means for injecting fuel into the cylinder at the inlet against the compression built up by the piston, an actuator for operating the injecting means, tripping means for periodically operating the actuator and means for adjusting the actuating means with relation to the injection means to vary the quantity of fuel injected and with relation to the tripping means to vary the time of fuel injection simultaneously with variations in the quantity of fuel injected.

10. An engine as set forth in claim 9 and a single operator for the adjusting means.

11. In an internal combustion engine, a plurality of cylinders, pistons working in the cylinders, fuel injection pumps for the cylinders connected therewith, a rotating member having tripping elements, actuators for the pumps in the path of the tripping elements and operated thereby, and means for simultaneously adjusting the actuators to alter their actuation by the tripping elements with relation to the position of the pistons.

12. In an internal combustion engine, a plurality of cylinders having pistons working therein, fuel injection pumps connected with said cylinders, plungers operating in said pumps, pivoted actuators for said plungers, means for tripping said actuators, and means for simultaneously adjusting the actuators.

13. In an internal combustion engine, a crank shaft, a plurality of cylinders having pistons working in the cylinders and actuated by the crank shaft, fuel injection pumps supplying said cylinders, plungers operating in said pumps, pivoted actuators engaging said plungers, means for tripping said actuators in timed relation to the rotation of the cam shaft, and means for simultaneously shifting said actuators to vary the point of contact thereof with said plungers.

14. In an internal combustion engine, a crank shaft, a plurality of cylinders, pistons working in said cylinders and actuated by the crank shaft, fuel injection pumps supplying said cylinders, plungers operating in said pumps, pivoted actuators operating said plungers, a ring actuated from said cam shaft, spaced cams carried by said ring and periodically engaging said actuators in timed relation to said crank shaft, a disc supporting said actuators, and means for rotating said disc to shift the actuator pivots and thereby vary the relation between said actuators and said plungers, whereby the plunger stroke and the time of fuel injection are simultaneously varied.

15. In an internal combustion engine, a crank shaft, a plurality of cylinders, pistons working in said cylinders and actuated by the crank shaft, fuel injection pumps supplying said cylinders, plungers operating in said pumps, pivoted actuators operating said plungers, a ring actuated from said cam shaft, spaced cams carried by said ring and periodically engaging said actuators in timed relation to said crank shaft, a disc supporting said actuators, and manually controlled means for rotating said disc to shift the actuator pivots and thereby vary the relation between said actuators and said plungers, whereby the plunger stroke and the time of fuel injection are simultaneously varied.

16. In an internal combustion engine, a plurality of cylinders, a fuel pump for each cylinder, a plunger for each pump, pivoted operators for the plungers, a cam ring for actuating said operators, a rotatable support to which the operators are attached, and means for rotating said support to simultaneously vary the stroke of the plungers and the time of fuel injection.

In testimony whereof I affix my signature.

FERI A. THAHELD.